Oct. 26, 1965        D. O. MISARE        3,214,624
LIGHTNING ARRESTER
Filed Nov. 26, 1963
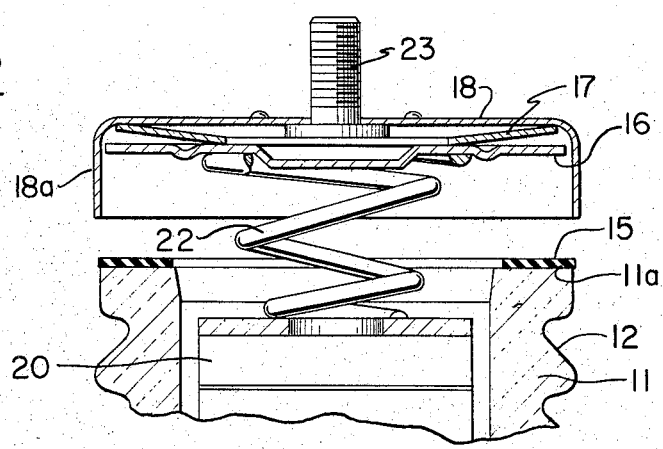
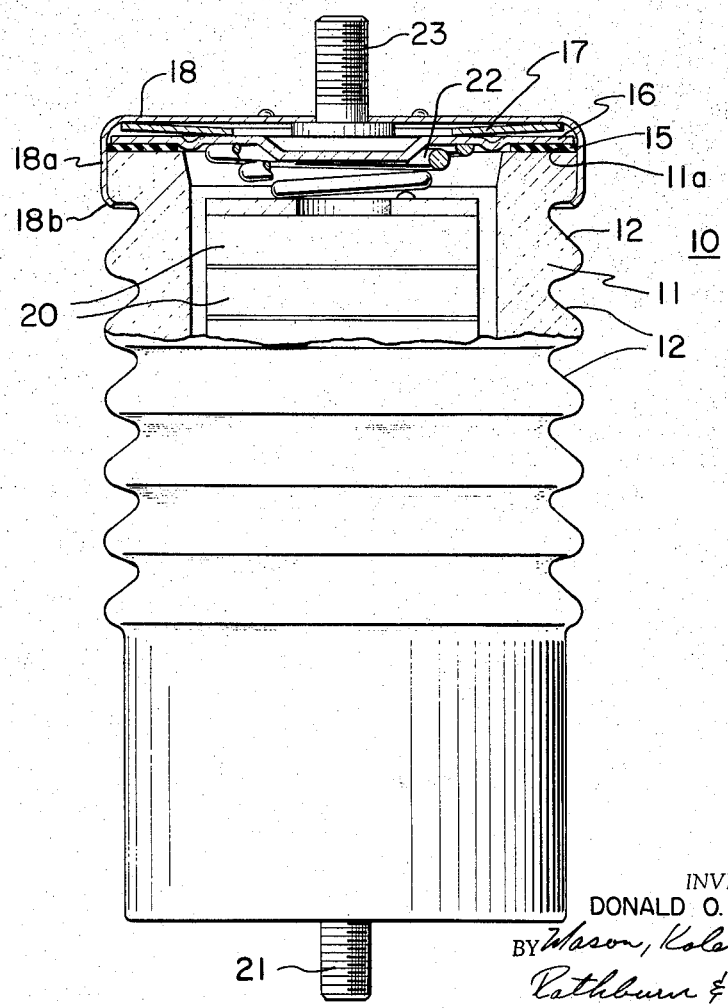
INVENTOR.
DONALD O. MISARE
BY Mason, Kolehmainen,
Rathburn & Wyss.
ATTORNEYS United States Patent Office 3,214,624
Patented Oct. 26, 1965

3,214,624
LIGHTNING ARRESTER
Donald O. Misare, Riverside, Ill., assignor to Joslyn Mfg. and Supply Co., Chicago, Ill., a corporation of Illinois
Filed Nov. 26, 1963, Ser. No. 325,848
6 Claims. (Cl. 313—231)

This invention relates to a new and improved lightning arrester, and, more specifically, to a lightning arrester of the type used in power transmission applications.

Commercially available lightning arresters for power transmission purposes commonly have a dielectric cylindrical housing closed at one or both ends with gasket seals and end caps or members. Ordinary arrester gasket seals, although proved tight by factory testing when new, can loosen under repeated weather temperature cycles and from cold flow or creep of the gasket material.

Accordingly, it is an object of the present invention to provide a new and improved lightning arrester which overcomes the above-mentioned difficulty.

A further object of the present invention is to provide a new and improved lightning arrester.

Yet another object of the present invention is to provide a lightning arrester having improved means for sealing the arrester against the weather.

Further objects and advantages of the present invention will become apparent as the following description proceeds and the features of novelty which characterize the invention will be pointed out with particularity in the claims annexed to and forming a part of this specification.

In accordance with these and many other objects of the present invention, there is provided a new and improved means for sealing the housing of a lightning arrester against the weather. According to the present invention, the arrester seals are spring-loaded to insure continuously tight waterproof seals against moisture. In one embodiment of the invention, the lightning arrester includes a dielectric cylindrical housing with means closing one end of the housing. A flat washer-shaped sealing gasket is positioned on the end surface at the other end of the housing and a generally disc-shaped gasket retaining plate is positioned over the plate. According to the present invention, a Belleville spring washer is positioned on the plate and compressed by a cap of inverted cup-shape secured to the housing end and covering the end of the housing to compress the spring thereby spring-loading the sealing gasket.

For a better understanding of the present invention, reference may be had to the accompanying drawings, wherein:

FIG. 1 is an elevational view, partly in section, of a lightning arrester according to the present invention; and, FIG. 2 is a fragmentary exploded view of the lightning arrester of FIG. 1.

In accordance with the invention, there is illustrated in FIG. 1 a lightning arrester 10 of the type used in power transmission. The arrester 10 in the illustrated embodiment is provided with a generally cylindrical housing 11 closed at the lower end and provided with a plurality of annular recesses 12 in its outer surface, at least one of the recesses being near the top end of the housing 11. The recesses provide cooling fins for the arrester and, additionally, serve as a means for positioning the arrester within a bracket and for providing for the closure of the housing.

In order to close the upper end of the housing 11 in tight waterproof manner against moisture and weather elements, the upper end surface 11a of the housing 11 is ground, and a flat neoprene washer-shaped gasket 15 is positioned on the ground end surface 11a. A generally disc-shaped gasket retaining plate 16 of stainless steel or other suitable material is positioned over the gasket 15.

To spring load the sealing gasket, a Belleville spring washer 17 is placed over the plate 16, and a cap 18 of inverted cup-shape of stainless steel or other suitable material is secured to the upper end of the housing. In the illustrated embodiment, the cylindrical side skirt 18a of the cap 18 is crimped into the uppermost of the recesses 12 as illustrated at 18b. The cap 18 is effective to compress the spring washer 17 between the inner surface of the cap and the plate 16 to spring-load the sealing gasket 15.

It will be understood that the lightning arrester 10 contains suitable valve and gap structure within the housing 11; for example, the lightning arrester 10 may contain components of the type illustrated and described in the copending application Serial No. 157,293, filed November 16, 1961, and assigned to the same assignee as the present invention. As therein described, the arrester 10 includes a plurality of quench gap elements 20 and suitable valve arrester material such as silicon carbide (not shown). An electrical circuit is completed through the arrester from a first connector 21 extending through the lower closure of the housing 11, to the internal electrical component within the arrester 10 including the quench gaps 20, and through a helical coil spring 22 to the plate 16, spring washer 17, cap 18, and a second end connector 23. The helical spring 22 is effective to maintain the internal electrical components of the arrester under compression and may, if desired, additionally apply a downward load on a lower gasket to continuously spring-load a lower weather gasket.

It will be appreciated that in accordance with the present invention the Belleville spring washer 17 is effective to continuously take up any creep or cold flow of the material forming the gasket 15 thereby to continuously maintain, oven an extended period of time, a tight waterproof seal between the plate 16 and the housing 11. In order to insure that such pressure is maintained for the life of the arrester regardless of any possible cold flow of the gasket 15, the spring washer 17 should have a displacement at least equal to the thickness of the gasket 15.

It has been found that a Belleville spring washer 17 is particularly advantageous in the lightning arrester since a Belleville spring washer characteristically applies a very large load over a very small distance. It has been found that a Belleville spring washer 17 exerting a force of about 700 lbs. will perform satisfactorily in a lightning arrester wherein the helical spring 22 applies a compressive load in the range of 125 to 200 lbs. In the particular illustrated embodiment of FIG. 1, the helical spring 22 is calibrated to provide a compressive load of about 150 lbs.

Although the present invention has been described by reference to only a single embodiment thereof, it will be apparent that many other numerous modifications and embodiments will be devised by those skilled in the art which will fall within the true spirit and scope of the present invention.

What is claimed as new and desired to be secured by Letters Patent of the United States is:

1. A lightning arrester comprising a dielectric cylindrical housing, closure means closing the one end of said cylinder, a flat washer-shaped gasket positioned on the end surface of the other end of said housing, a generally disc-shaped gasket retaining plate positioned over said gasket, a Belleville spring washer positioned on said plate, and a cap of inverted cup-shape secured to said housing and covering said other end of said housing to compress said spring washer.

2. A lightning arrester comprising a vertical dielectric cylindrical housing having an annular recess in the outer surface near its upper end, closure means closing the bottom of said cylinder, a flat neoprene washer-shaped gasket positioned on the top end surface of said housing, a generally disc-shaped gasket retaining plate positioned over said gasket, a Belleville spring washer positioned on said plate, and a cap of inverted cup-shaped covering the upper end of said housing and including a cylindrical skirt crimped into said recess, said spring washer being compressed to apply pressure to said gasket through said plate.

3. A lightning arrester as set forth in claim 2 above additionally including electric components within said housing and a helical coil spring compressively interposed between said components and said plate.

4. A lightning arrester as set forth in claim 3 above wherein there is provided a first electrical connector extending through said closure means and a second electrical connector engaging said cap, and wherein an electrical circuit is defined between said connectors and including said cap, said spring washer, said plate, and said helical spring.

5. A lightning arrester comprising a vertical dielectric cylindrical housing having an annular recess in the outer surface near its upper end, closure means closing the bottom of said cylinder, a flat neoprene washer-shaped gasket positioned on the top end surface of said housing, a generally disc-shaped gasket retaining plate positioned over said gasket, a cap of inverted cup-shape covering the upper end of said housing and including a cylindrical skirt crimped into said recess, a Belleville spring washer exerting a large force and positioned between said plate and said cap compressing said gasket through said plate, a plurality of electric components within said housing, and a helical coil spring exerting a lesser force than said Belleville spring washer and compressively interposed between said components and said plate.

6. A lightning arrester comprising a vertical dielectric cylindrical housing having an annular recess in the outer surface near its upper end, closure means closing the bottom of said cylinder, a flat neoprene washer-shaped gasket positioned on the top end surface of said housing, a generally disc-shaped gasket retaining plate positioned over said gasket, a cap of inverted cup-shape covering the upper end of said housing and including a cylindrical skirt crimped into said recess, and a Belleville spring washer positioned between said plate and said cap compressing said gasket through said plate, said spring washer having a displacement greater than the thickness of said gasket.

References Cited by the Examiner

UNITED STATES PATENTS

| 2,728,810 | 12/55 | Ziehr | 174—75 |
| 2,729,713 | 1/56 | Berner et al. | 200—61.54 |
| 2,928,016 | 3/60 | Schultz | 313—231 X |

FOREIGN PATENTS 185,250   7/36   Germany.

JOHN W. HUCKERT, *Primary Examiner.*

DAVID J. GALVIN, *Examiner.*